(12) United States Patent
Wang et al.

(10) Patent No.: US 11,264,793 B2
(45) Date of Patent: Mar. 1, 2022

(54) METHOD AND DEVICE FOR QUICKLY ELIMINATING FERROMAGNETIC RESONANCE OF VOLTAGE TRANSFORMER

(71) Applicants: NR ELECTRIC CO., LTD, Nanjing (CN); NR ENGINEERING CO., LTD, Nanjing (CN)

(72) Inventors: Honglin Wang, Nanjing (CN); Kai Wang, Nanjing (CN); Qixue Zhang, Nanjing (CN); Guang Wang, Nanjing (CN); Jun Chen, Nanjing (CN)

(73) Assignees: NR ELECTRIC CO., LTD, Nanjing (CN); NR ENGINEERING CO., LTD, Nanjing (CN)

( * ) Notice: Subject to any disclaimer, the term of this patent is extended or adjusted under 35 U.S.C. 154(b) by 165 days.

(21) Appl. No.: 16/649,438

(22) PCT Filed: Apr. 10, 2019

(86) PCT No.: PCT/CN2019/082008
§ 371 (c)(1),
(2) Date: Mar. 20, 2020

(87) PCT Pub. No.: WO2019/210768
PCT Pub. Date: Nov. 7, 2019

(65) Prior Publication Data
US 2020/0287379 A1    Sep. 10, 2020

(30) Foreign Application Priority Data

May 4, 2018    (CN) .......................... 201810417417.6

(51) Int. Cl.
*H02H 9/00*    (2006.01)
(52) U.S. Cl.
CPC .................................. *H02H 9/007* (2013.01)

(58) Field of Classification Search
CPC ...................................................... H02H 9/007
See application file for complete search history.

(56) References Cited

U.S. PATENT DOCUMENTS 3,401,272 A * 9/1968 Rosa ...................... H02H 9/007
307/327
3,624,499 A * 11/1971 Smith ................... H01F 27/402
324/86

(Continued)

FOREIGN PATENT DOCUMENTS

CN        104377680        2/2015

OTHER PUBLICATIONS

International search report dated Jun. 19, 2019 from corresponding application No. PCT/CN2019/082008.

(Continued)

*Primary Examiner* — Scott Bauer
(74) *Attorney, Agent, or Firm* — Hauptman Ham, LLP

(57) ABSTRACT

The present invention discloses a method for quickly eliminating ferromagnetic resonance of a voltage transformer. The method includes: first sampling a three-phase voltage and an open-delta voltage of a voltage transformer; calculating a flux linkage corresponding to a zero-sequence voltage by means of an integral algorithm; and when detecting that ferromagnetic resonance occurs in the mutual inductor, further checking whether the absolute value of the flux linkage corresponding to the zero-sequence voltage or the absolute value of the open-delta voltage respectively falls within a set range, and if yes, starting a secondary resonance elimination loop for resonance elimination. The present invention also discloses a corresponding device for quickly eliminating ferromagnetic resonance of a voltage transformer. The present method and device accurately analyze and control resonance elimination trigger time based on a conventional secondary resonance elimination principle, (Continued)

and can effectively eliminate the impact of the core saturation of a voltage transformer on a resonance elimination process, thereby greatly improving the success probability of single resonance elimination.

13 Claims, 1 Drawing Sheet

(56) References Cited

U.S. PATENT DOCUMENTS

| | | | | |
|---|---|---|---|---|
| 3,666,991 | A * | 5/1972 | Wolf .................. | H02H 9/007 |
| | | | | 361/35 |
| 7,558,032 | B2 * | 7/2009 | Piasecki ............... | H02H 9/007 |
| | | | | 361/35 |
| 9,246,326 | B2 * | 1/2016 | Dong .................. | G06N 5/048 |
| 10,374,427 | B2 * | 8/2019 | Xu ..................... | H02H 9/007 |

OTHER PUBLICATIONS

Written Opinion dated Jun. 19, 2019 from corresponding application No. PCT/CN2019/082008.

* cited by examiner

US 11,264,793 B2

METHOD AND DEVICE FOR QUICKLY ELIMINATING FERROMAGNETIC RESONANCE OF VOLTAGE TRANSFORMER

RELATED APPLICATIONS

The present application is a National Phase of International Application Number PCT/CN2019/082008, filed Apr. 10, 2019, and claims the priority of China Application No. 201810417417.6, filed May 4, 2018.

TECHNICAL FIELD

The present invention relates to fault elimination of a voltage transformer in a power system, and in particular, to a method and device for controlling harmonic elimination when ferromagnetic resonance occurs in a voltage transformer of a neutral-point indirectly grounded system.

BACKGROUND

In the neutral-point indirectly grounded system, neutral points of primary windings of some voltage transformers for measuring voltages to ground are directly grounded; when a no-load bus is closed, a single-phase ground fault disappears, or the system load changes dramatically, the excitation inductance of the voltage transformers would change non-linearly and may form a parameter match with the capacitance to ground of the system, leading to a ferromagnetic resonance phenomenon and causing system overvoltage and voltage transformer overcurrent, which cause insulation damage, grounding or phase-to-phase faults and fuse blow, burn-out or explosion of the voltage transformers, or even faults such as lightning arrester explosion, weak insulation flashover, and misoperation of a ground fault line selection device, thus seriously affecting the safe operation of the system.

At present, a common countermeasure against the ferromagnetic resonance phenomenon occurring in a voltage transformer is to install a microcomputer-based resonance elimination device. The basic principle of the device is that: an open-delta voltage of the secondary side of the voltage transformer is input to the microcomputer-based resonance elimination device, ferromagnetic resonance is identified by analyzing the harmonic characteristics of the open-delta voltage and the magnitude of harmonic component, and when ferromagnetic resonance occurs in the voltage transformer, short-circuiting is triggered for a short time by an electronic switching device multiple times at the open-delta winding of the voltage transformer (or a small damping resistor RA is connected thereto) to destroy resonance generation conditions, thereby eliminating the resonance.

At present, for most of the existing microcomputer-based resonance elimination devices, a resonance elimination loop is put to use after a short delay or no delay when resonance is detected. This method has a large difference in the effect of harmonic elimination in field applications, resonance elimination failures often occur, and in extreme cases, new resonance or even more severe resonance may occur after the resonance elimination loop is put into use. Therefore, it is necessary to control the resonance elimination process more accurately, so that resonance can be eliminated more effectively and quickly when the harmonic elimination loop is put into use.

SUMMARY

The purpose of the present invention is to provide a method and device for controlling quick resonance elimination when ferromagnetic resonance occurs in a voltage transformer, in order to control a resonance elimination process more accurately and reduce the impact of nonlinear characteristics of a mutual inductor on the resonance elimination process, so that resonance can be effectively and quickly eliminated when a resonance fault occurs.

The technical solution adopted by the present invention is as follow: a method for quickly eliminating ferromagnetic resonance of a voltage transformer, including the following steps:

step 1: collecting a three-phase voltage secondary value and an open-delta voltage of a voltage transformer in real time;

step 2: calculating a flux linkage $\psi_0$ corresponding to a zero-sequence voltage in real time according to the three-phase voltage secondary value or the open-delta voltage collected in real time; and step 3: when detecting that ferromagnetic resonance occurs in the voltage transformer, further checking whether the absolute value of the flux linkage corresponding to the zero-sequence voltage or the absolute value of the open-delta voltage respectively falls within a set range, if yes, triggering a silicon controlled rectifier resonance elimination loop connected in parallel to both ends of an open-delta winding of the voltage transformer to be quickly turned on, to eliminate ferromagnetic resonance, and if not, not triggering the silicon controlled rectifier resonance elimination loop to be turned on.

Furthermore, in the step 2, the flux linkage $\psi_0$ corresponding to the zero-sequence voltage is calculated by means of the three-phase voltage secondary value or the open-delta voltage with a calculation formula shown as follows:

$$\psi_0 = -\int (U_A + U_B + U_C) dt$$

or $\psi_0 = -\int (3U_0) dt$ wherein $U_A$, $U_B$, $U_C$, and $3U_0$ are three-phase voltage secondary values and an open-delta voltage, respectively.

Furthermore, in the step 3, the ferromagnetic resonance occurring in the voltage transformer includes fractional-frequency ferromagnetic resonance, fundamental-frequency ferromagnetic resonance, and multiple-frequency ferromagnetic resonance.

Furthermore, in the step 3, the absolute value of the flux linkage corresponding to the zero-sequence voltage falling within the set range means that the flux linkage $\psi_0$ corresponding to the zero-sequence voltage satisfies $|\psi_0| \leq K1 * \psi_N$, wherein K1 is a coefficient, $$\psi_N = \frac{U_m}{\omega},$$

$U_m$ is a rated secondary voltage peak value of the voltage transformer, and $\omega$ is power-frequency angular frequency. The value range of K1 may be 0.01-0.2.

Furthermore, in the step 3, the absolute value of the open-delta voltage falling within the set range means that the absolute value of the open-delta voltage $3U_0$ satisfies $|3U_0| \geq K2 * U_{max}$, wherein $U_{max}$ is the maximum value of the open-delta voltage collected in the previous resonance period when the resonance is detected, and K2 is a coefficient. The value range of K2 may be 0.8-1.0.

Furthermore, in the step 3, a silicon controlled rectifier loop includes a silicon controlled rectifier capable of being bidirectionally turned on and a resonance elimination resistor connected in series thereto; the silicon controlled rectifier loop is mounted in parallel at the output port of an open-delta loop on the secondary side of the voltage transformer, and is connected in parallel to an open-delta voltage measurement loop.

Furthermore, in the step 3, triggering the silicon controlled rectifier loop means issuing a turn-on instruction to a silicon controlled rectifier in the loop, so that the silicon controlled rectifier is in an ON state in both forward and reverse directions.

The present invention also provides a device for quickly eliminating ferromagnetic resonance of a voltage transformer, comprising a collection unit, a calculation unit, and a detection and resonance elimination unit, wherein the collection unit collects a three-phase voltage secondary value and an open-delta voltage of a voltage transformer in real time;

the calculation unit receives measured data of the collection unit, and calculates a flux linkage $\psi_0$ corresponding to a zero-sequence voltage in real time according to the three-phase voltage secondary value or the open-delta voltage collected in real time; and the detection and resonance elimination unit receives the measured and calculated data of the collection unit and the calculation unit, and when detecting that ferromagnetic resonance occurs in the voltage transformer, further checks whether the absolute value of the flux linkage corresponding to the zero-sequence voltage or the absolute value of the open-delta voltage respectively falls within a set range, if yes, triggers a silicon controlled rectifier resonance elimination loop connected in parallel to both ends of an open-delta winding of the voltage transformer to be quickly turned on, to eliminate ferromagnetic resonance, and if not, does not trigger the silicon controlled rectifier resonance elimination loop to be turned on.

Furthermore, in the calculation unit, the flux linkage $\psi_0$ corresponding to the zero-sequence voltage is calculated by means of the three-phase voltage secondary value or the open-delta voltage with a calculation formula shown as follows:

$$\psi_0 = -\int(U_A + U_B + U_C)dt$$

or $\psi_0 = -\int(3U_0)dt$ wherein $U_A$, $U_B$, $U_C$, and $3 U_0$ are three-phase voltage secondary values and an open-delta voltage, respectively.

Furthermore, in the detection and resonance elimination unit, the absolute value of the flux linkage corresponding to the zero-sequence voltage falling within the set range means that the flux linkage $\psi_0$ corresponding to the zero-sequence voltage satisfies $|\psi_0| \leq K1 * \psi_N$, wherein K1 is a coefficient, $$\psi_N = \frac{U_m}{\omega}, U_m$$

is a rated secondary voltage peak value of the voltage transformer, and ω is power-frequency angular frequency. The value range of K1 may be 0.01-0.2.

Furthermore, in the detection and resonance elimination unit, the absolute value of the open-delta voltage falling within the set range means that the absolute value of the open-delta voltage $3 U_0$ satisfies $|3 U_0| \geq K2 * U_{max}$, wherein $U_{max}$ is the maximum value of the open-delta voltage collected in the previous resonance period when the resonance is detected, and K2 is a coefficient. The value range of K2 may be 0.8-1.0.

Furthermore, in the detection and resonance elimination unit, a silicon controlled rectifier loop includes a silicon controlled rectifier capable of being bidirectionally turned on and a resonance elimination resistor connected in series thereto; the silicon controlled rectifier loop is mounted in parallel at the output port of an open-delta loop on the secondary side of the voltage transformer, and is connected in parallel to an open-delta voltage measurement loop.

Furthermore, in the detection and resonance elimination unit, triggering the silicon controlled rectifier loop means issuing a turn-on instruction to a silicon controlled rectifier in the loop, so that the silicon controlled rectifier is in an ON state in both forward and reverse directions.

The present invention has the following beneficial effects: for harmonic elimination measures for ferromagnetic resonance occurring in a voltage transformer of an ungrounded system, a method for controlling the trigger of a resonance elimination loop by analyzing a flux linkage and an open-delta voltage of the voltage transformer is adopted based on a conventional secondary resonance elimination principle, and the resonance elimination loop is put into use when the flux linkage corresponding to a zero-sequence voltage is minimum or the open-delta voltage is maximum, so that the impact of core saturation on the resonance elimination process is avoided; the operation time and resonance elimination discharge current of the resonance elimination device are reduced, the success rate of resonance elimination is effectively improved, and the impact of the operation of the resonance elimination device on the system and a relay protection device or the like is reduced. Upon a large number of experiments, no matter for what frequency of ferromagnetic resonance, use of this trigger mechanism can greatly improve the success probability of harmonic elimination, significantly reduce the time required for the harmonic elimination process, and reduce the impact on the entire system.

DETAILED DESCRIPTION

Further description is made below with reference to the accompanying drawings and the specific embodiments.

Figure 1:
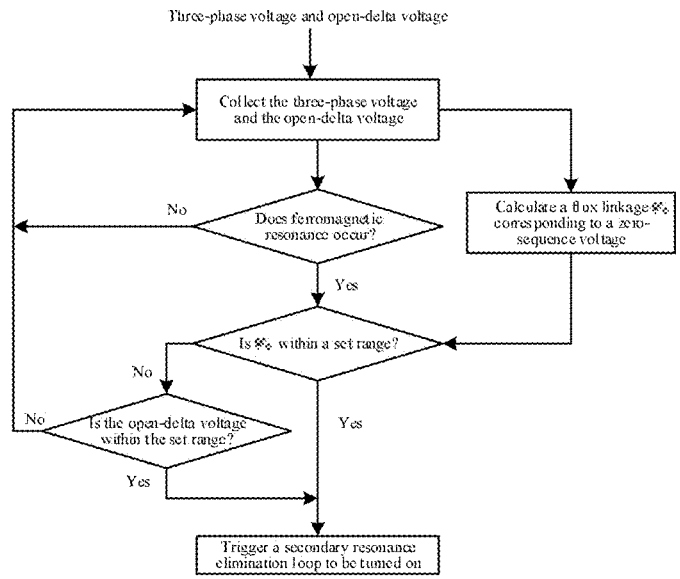
FIG. 1 is a schematic flowchart of a method according to the present invention.

The present invention provides a method for quickly eliminating ferromagnetic resonance of a voltage transformer, as shown in FIG. 1 which is a schematic flowchart of a method according to the present invention, including the following steps:

step 1: collecting a three-phase voltage secondary value and an open-delta voltage of a voltage transformer in real time;

step 2: calculating a flux linkage $\psi_0$ corresponding to a zero-sequence voltage in real time according to the three-phase voltage secondary value or the open-delta voltage collected in real time; and step 3: when detecting that ferromagnetic resonance occurs in the voltage transformer, further checking whether the absolute value of the flux linkage corresponding to the zero-sequence voltage or the absolute value of the open-delta voltage respectively falls within a set range, if yes, triggering a silicon controlled rectifier resonance elimination loop connected in parallel to both ends of an open-delta winding of the voltage transformer to be quickly turned on, to eliminate ferromagnetic resonance, and if not, not triggering the silicon controlled rectifier resonance elimination loop to be turned on.

Furthermore, in the step 2, the flux linkage $\psi_0$ corresponding to the zero-sequence voltage is calculated by means of the three-phase voltage secondary value or the open-delta voltage with a calculation formula shown as follows:

$$\psi_0 = -\int (U_A + U_B + U_C) dt$$

or $\psi_0 = -\int (3U_0) dt$ wherein $U_A$, $U_B$, $U_C$, and $3 U_0$ are three-phase voltage secondary values and an open-delta voltage, respectively.

Furthermore, in the step 3, the ferromagnetic resonance occurring in the voltage transformer includes fractional-frequency ferromagnetic resonance, fundamental-frequency ferromagnetic resonance, and multiple-frequency ferromagnetic resonance.

Furthermore, in the step 3, the absolute value of the flux linkage corresponding to the zero-sequence voltage falling within the set range means that the flux linkage $\psi_0$ corresponding to the zero-sequence voltage satisfies $|\psi_0| \leq K1 * \psi_N$, wherein K1 is a coefficient, $$\psi_N = \frac{U_m}{\omega},$$

$U_m$ is a rated secondary voltage peak value of the voltage transformer, and $\omega$ is power-frequency angular frequency. The value range of K1 may be 0.01-0.2.

Furthermore, in the step 3, the absolute value of the open-delta voltage falling within the set range means that the absolute value of the open-delta voltage $3U_0$ satisfies $|3U_0| \geq K2 * U_{max}$, wherein $U_{max}$ is the maximum value of the open-delta voltage collected in the previous resonance period when the resonance is detected, and K2 is a coefficient. The value range of K2 may be 0.8-1.0.

Figure 2:
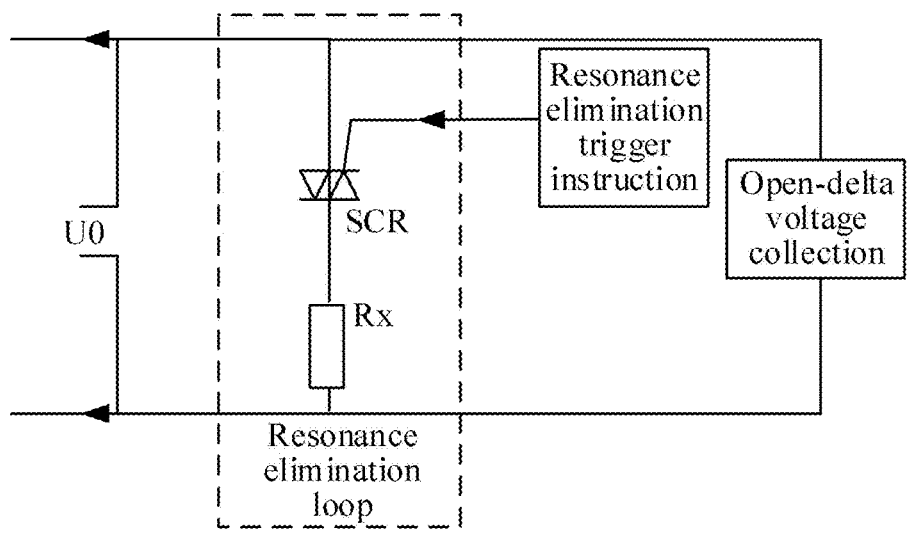
FIG. 2 is a schematic diagram of a silicon controlled rectifier resonance elimination loop.

Furthermore, in the step 3, a silicon controlled rectifier loop includes a silicon controlled rectifier capable of being bidirectionally turned on and a resonance elimination resistor connected in series thereto; the silicon controlled rectifier loop is mounted in parallel at the output port of an open-delta loop on the secondary side of the voltage transformer, and is connected in parallel to an open-delta voltage measurement loop. FIG. 2 is a schematic diagram of a silicon controlled rectifier resonance elimination loop.

Furthermore, in the step 3, triggering the silicon controlled rectifier loop means issuing a turn-on instruction to a silicon controlled rectifier in the loop, so that the silicon controlled rectifier is in an ON state in both forward and reverse directions.

An ungrounded system normally has no zero-sequence voltage, i.e., the open-delta voltage $3 U_0 = 0V$. The flux linkage corresponding to the zero-sequence voltage is $\psi_0 = -\int (3 U_0) dt = 0$.

For a general voltage transformer, the rated value of a phase voltage of the secondary side is 57.74 V and the peak value is $57.74\sqrt{2}$ V. According to the descriptions of the summary, the rated value of the flux linkage corresponding to the zero-sequence voltage may be obtained, i.e., $$\psi_N = \frac{U_m}{\omega} = \frac{57.74V \cdot \sqrt{2}}{2\pi \cdot 50 \text{ Hz}} = \frac{\sqrt{2/3}}{\pi} Wb.$$

At a certain time, triple-frequency resonance occurs in the system; in this case, a triple-frequency voltage appears at the open delta, an open-delta voltage value when the resonance occurs is set to $U_0 = A_0 \sin(3\omega t)$, where $A_0$ is the magnitude of a triple-frequency voltage and is 300 V, and $3\omega = 3 \times 2\pi \times 50$ Hz is resonance angular frequency of triple frequency.

(1) Trigger time is calculated according to the flux linkage corresponding to the zero-sequence voltage According to the formula in the step 2, the flux linkage $\psi_0$ corresponding to the zero-sequence voltage may be calculated and is $$\psi_0 = -\int (3U_0) dt = -\int (300V \cdot \sin(300\pi \cdot t)) dt = \frac{1}{\pi} \cdot \cos(300\pi \cdot t) Wb$$

when $\psi_0$ satisfies $|\psi_0| \leq K * \psi_N$, the resonance elimination loop is triggered to be turned on, the coefficient is K=0.2, and $$-0.2 \times \frac{\sqrt{2/3}}{\pi} \leq \frac{1}{\pi} \cdot \cos(300\pi \cdot t) \leq 0.2 \times \frac{\sqrt{2/3}}{\pi}$$

the value of t may be obtained and is $$\frac{2\pi n + 1.4068}{300\pi} \leq t \leq \frac{2\pi n + 1.7348}{300\pi} \ (n = 0, 1, 2...) \text{ or } \frac{2\pi n - 1.7348}{300\pi} \leq$$

$$t \leq \frac{2\pi n - 1.4068}{300\pi} \ (n = 1, 2, 3...)$$

that is, when t is within the above range, conditions of the flux linkage $\psi_0$ are satisfied, and the resonance elimination loop is triggered to be turned on.

(2) The trigger time is calculated according to the open-delta voltage the open-delta voltage is $3 U_0 = 300 \sin(300\pi \cdot t)$, the maximum value of the open-delta voltage is $3 U_{0.max} = 300V$, the open-delta voltage satisfies $|3 U_0| \geq K \cdot U_{0.max}$, the coefficient is K=0.9, and $|300 \sin(300\pi \cdot t)| \geq 300 \times 0.9$; the value of t may be obtained and is $$\frac{2\pi n + 1.120}{300\pi} \leq t \leq \frac{2\pi n + 2.022}{300\pi} \ (n = 0, 1, 2...) \text{ or } \frac{2\pi n - 2.022}{300\pi} \leq$$

$$t \leq \frac{2\pi n - 1.120}{300\pi} \ (n = 1, 2, 3...)$$

that is, when t is within the above range, conditions of the open-delta voltage are satisfied, and the resonance elimination loop is triggered to be turned on.

The trigger time range calculated according to the flux linkage $\psi_0$ corresponding to the zero-sequence voltage overlaps the trigger time range calculated according to the open-delta voltage in most cases. When the open-delta voltage is the maximum value at resonance, the corresponding flux linkage is basically the minimum value. Therefore, the trigger time calculated by the two methods is basically the same, and there is no conflict between the two methods.

The present invention also provides a device for quickly eliminating ferromagnetic resonance of a voltage transformer, comprising a collection unit, a calculation unit, and a detection and resonance elimination unit, wherein the collection unit collects a three-phase voltage secondary value and an open-delta voltage of a voltage transformer in real time;

the calculation unit receives measured data of the collection unit, and calculates a flux linkage $\psi_0$ corresponding to a zero-sequence voltage in real time according to the three-phase voltage secondary value or the open-delta voltage collected in real time; and the detection and resonance elimination unit receives the measured and calculated data of the collection unit and the calculation unit, and when detecting that ferromagnetic resonance occurs in the voltage transformer, further checks whether the absolute value of the flux linkage corresponding to the zero-sequence voltage or the absolute value of the open-delta voltage respectively falls within a set range, if yes, triggers a silicon controlled rectifier resonance elimination loop connected in parallel to both ends of an open-delta winding of the voltage transformer to be quickly turned on, to eliminate ferromagnetic resonance, and if not, does not trigger the silicon controlled rectifier resonance elimination loop to be turned on.

Furthermore, in the calculation unit, the flux linkage $\psi_0$ corresponding to the zero-sequence voltage is calculated by means of the three-phase voltage secondary value or the open-delta voltage with a calculation formula shown as follows:

$$\psi_0 = -\int(U_A + U_B + U_C)dt$$

or $\psi_0 = -\int(3U_0)dt$ wherein $U_A$, $U_B$, $U_C$, and $3U_0$ are three-phase voltage secondary values and an open-delta voltage, respectively.

Furthermore, in the detection and resonance elimination unit, the absolute value of the flux linkage corresponding to the zero-sequence voltage falling within the set range means that the flux linkage $\psi_0$ corresponding to the zero-sequence voltage satisfies $|\psi_0| \leq K1 * \psi_N$, wherein K1 is a coefficient, $$\psi_N = \frac{U_m}{\omega}, U_m$$

is a rated secondary voltage peak value of the voltage transformer, and $\omega$ is power-frequency angular frequency. The value range of K1 may be 0.01-0.2.

Furthermore, in the detection and resonance elimination unit, the absolute value of the open-delta voltage falling within the set range means that the absolute value of the open-delta voltage $3U_0$ satisfies $|3U_0| \geq K2*U_{max}$ wherein $U_{max}$ is the maximum value of the open-delta voltage collected in the previous resonance period when the resonance is detected, and K2 is a coefficient. The value range of K2 may be 0.8-1.0.

Furthermore, in the detection and resonance elimination unit, a silicon controlled rectifier loop includes a silicon controlled rectifier capable of being bidirectionally turned on and a resonance elimination resistor connected in series thereto; the silicon controlled rectifier loop is mounted in parallel at the output port of an open-delta loop on the secondary side of the voltage transformer, and is connected in parallel to an open-delta voltage measurement loop.

Furthermore, in the detection and resonance elimination unit, triggering the silicon controlled rectifier loop means issuing a turn-on instruction to a silicon controlled rectifier in the loop, so that the silicon controlled rectifier is in an ON state in both forward and reverse directions.

The foregoing embodiments are only intended to explain the technical idea of the present invention, and cannot be used for limiting the scope of protection of the preset invention. Any equivalent replacement or modification made based on the technical solutions according to the technical idea proposed by the present invention does not exceed the scope of protection of the present invention.

What is claimed is:

1. A method for quickly eliminating ferromagnetic resonance of a voltage transformer, comprising the following steps:

step 1: collecting a three-phase voltage secondary value and an open-delta voltage of a voltage transformer in real time;

step 2: calculating a flux linkage $\psi_0$ corresponding to a zero-sequence voltage in real time according to the three-phase voltage secondary value or the open-delta voltage collected in real time; and step 3: when detecting that ferromagnetic resonance occurs in the voltage transformer, further checking whether an absolute value of the flux linkage corresponding to the zero-sequence voltage or an absolute value of the open-delta voltage respectively falls within a set range, if yes, triggering a silicon controlled rectifier resonance elimination loop connected in parallel to both ends of an open-delta winding of the voltage transformer to be quickly turned on, to eliminate ferromagnetic resonance, and if not, not triggering the silicon controlled rectifier resonance elimination loop to be turned on.

2. The method for quickly eliminating ferromagnetic resonance of a voltage transformer according to claim 1, wherein in the step 2, the flux linkage $\psi_0$ corresponding to the zero-sequence voltage is calculated by means of the three-phase voltage secondary value or the open-delta voltage with a calculation formula shown as follows:

$$\psi_0 = -\int(U_A + U_B + U_C)dt$$

or $\psi_0 = -\int(3U_0)dt$ wherein $U_A$, $U_B$, $U_C$, and $3U_0$ are three-phase voltage secondary values and an open-delta voltage, respectively.

3. The method for quickly eliminating ferromagnetic resonance of a voltage transformer according to claim 1, wherein in the step 3, the ferromagnetic resonance occurring in the voltage transformer comprises fractional-frequency ferromagnetic resonance, fundamental-frequency ferromagnetic resonance, and multiple-frequency ferromagnetic resonance.

4. The method for quickly eliminating ferromagnetic resonance of a voltage transformer according to claim 1, wherein in the step 3, the absolute value of the flux linkage corresponding to the zero-sequence voltage falling within the set range means that the flux linkage $\psi_0$ corresponding to the zero-sequence voltage satisfies $|\psi_0| \leq K1*\psi_N$, wherein K1 is a coefficient, $$\psi_N = \frac{U_m}{\omega}, U_m$$

is a rated secondary voltage peak value of the voltage transformer, and $\omega$ power-frequency angular frequency.

5. The method for quickly eliminating ferromagnetic resonance of a voltage transformer according to claim 1, wherein in the step 3, the absolute value of the open-delta voltage falling within the set range means that the absolute value of the open-delta voltage 3 U satisfies |3 U$_0$|≥K2*U$_{max}$, wherein U$_{max}$ is the maximum value of the open-delta voltage collected in the previous resonance period when the resonance is detected, and K2 is a coefficient.

6. The method for quickly eliminating ferromagnetic resonance of a voltage transformer according to claim 1, wherein in the step 3, a silicon controlled rectifier loop comprises a silicon controlled rectifier capable of being bidirectionally turned on and a resonance elimination resistor connected in series thereto; the silicon controlled rectifier loop is mounted in parallel at the output port of an open-delta loop on the secondary side of the voltage transformer, and is connected in parallel to an open-delta voltage measurement loop.

7. The method for quickly eliminating ferromagnetic resonance of a voltage transformer according to claim 1, wherein in the step 3, triggering the silicon controlled rectifier loop means issuing a turn-on instruction to a silicon controlled rectifier in the loop, so that the silicon controlled rectifier is in an ON state in both forward and reverse directions.

8. A device for quickly eliminating ferromagnetic resonance of a voltage transformer, comprising a collection unit, a calculation unit, and a detection and resonance elimination unit, wherein:
the collection unit collects a three-phase voltage secondary value and an open-delta voltage of a voltage transformer in real time;
the calculation unit receives measured data of the collection unit, and calculates a flux linkage $\psi_0$ corresponding to a zero-sequence voltage in real time according to the three-phase voltage secondary value or the open-delta voltage collected in real time; and
the detection and resonance elimination unit receives the measured and calculated data of the collection unit and the calculation unit, and when detecting that ferromagnetic resonance occurs in the voltage transformer, further checks whether the absolute value of the flux linkage corresponding to the zero-sequence voltage or the absolute value of the open-delta voltage respectively falls within a set range, if yes, triggers a silicon controlled rectifier resonance elimination loop connected in parallel to both ends of an open-delta winding of the voltage transformer to be quickly turned on, to eliminate ferromagnetic resonance, and if not, does not trigger the silicon controlled rectifier resonance elimination loop to be turned on.

9. The device for quickly eliminating ferromagnetic resonance of a voltage transformer according to claim 8, wherein in the calculation unit, the flux linkage $\psi_0$ corresponding to the zero-sequence voltage is calculated by means of the three-phase voltage secondary value or the open-delta voltage with a calculation formula shown as follows:

$$\psi_0 = -\int (U_A + U_B + U_C) dt$$

or $\psi_0 = -\int (3U_0) dt$ wherein $U_A$, $U_B$, $U_C$, and 3 $U_0$ are three-phase voltage secondary values and an open-delta voltage, respectively.

10. The device for quickly eliminating ferromagnetic resonance of a voltage transformer according to claim 8, wherein in the detection and resonance elimination unit, the absolute value of the flux linkage corresponding to the zero-sequence voltage falling within the set range means that the flux linkage $\psi_0$ corresponding to the zero-sequence voltage satisfies |$\psi_0$|≤K1*$\psi_N$, wherein K1 is a coefficient, $$\psi_N = \frac{U_m}{\omega}, U_m$$

is a rated secondary voltage peak value of the voltage transformer, and ω is power-frequency angular frequency.

11. The device for quickly eliminating ferromagnetic resonance of a voltage transformer according to claim 8, wherein in the detection and resonance elimination unit, the absolute value of the open-delta voltage falling within the set range means that the absolute value of the open-delta voltage 3 U$_0$ satisfies |3 U$_0$|≥K2*U$_{max}$, wherein U$_{max}$ is the maximum value of the open-delta voltage collected in the previous resonance period when the resonance is detected, and K2 is a coefficient.

12. The device for quickly eliminating ferromagnetic resonance of a voltage transformer according to claim 8, wherein in the detection and resonance elimination unit, a silicon controlled rectifier loop comprises a silicon controlled rectifier capable of being bidirectionally turned on and a resonance elimination resistor connected in series thereto; the silicon controlled rectifier loop is mounted in parallel at the output port of an open-delta loop on the secondary side of the voltage transformer, and is connected in parallel to an open-delta voltage measurement loop.

13. The device for quickly eliminating ferromagnetic resonance of a voltage transformer according to claim 8, wherein in the detection and resonance elimination unit, triggering the silicon controlled rectifier loop means issuing a turn-on instruction to a silicon controlled rectifier in the loop, so that the silicon controlled rectifier is in an ON state in both forward and reverse directions.

* * * * *